L. Miller
Mower.
No 764
Reissued Jul. 19, 1859.
Fig: 1.
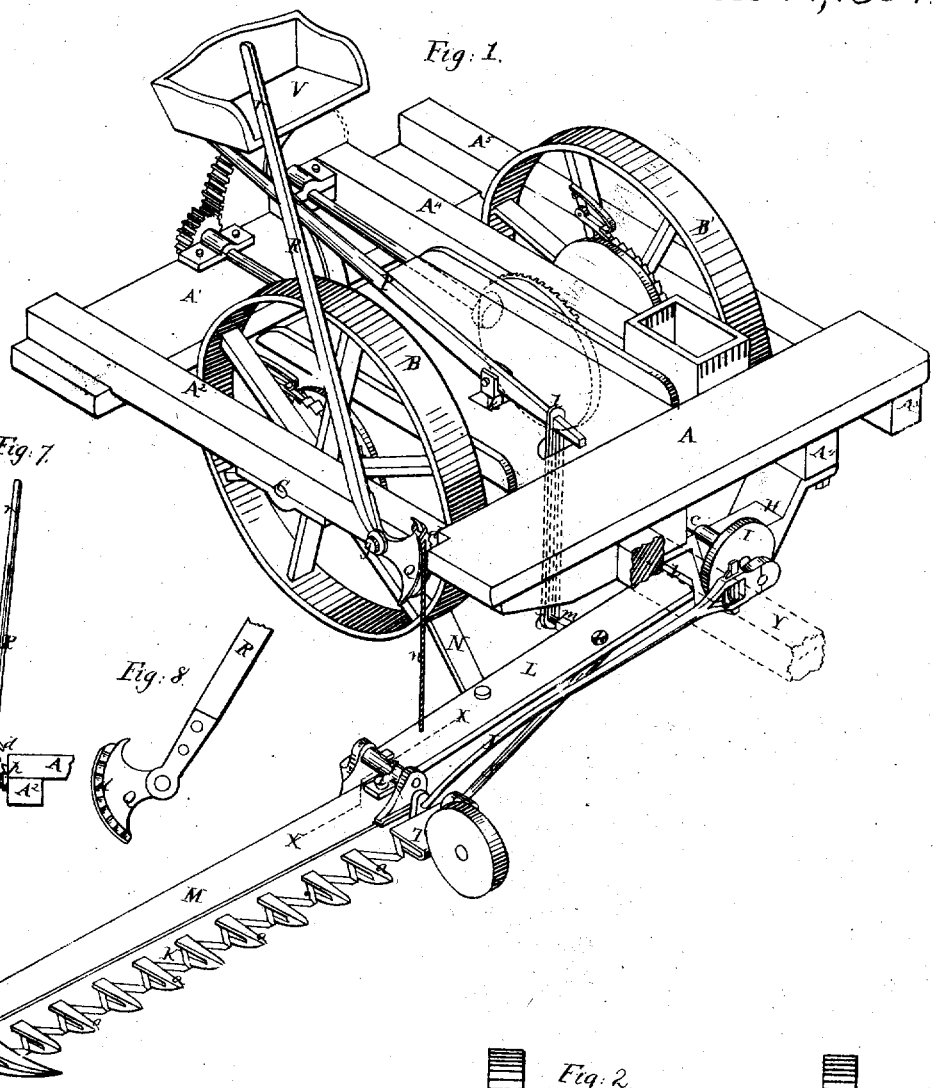
Fig: 6.
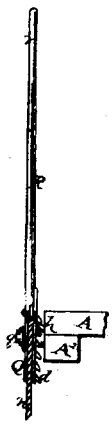
Fig: 7.
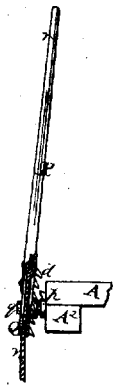
Fig: 8.
Fig: 2.
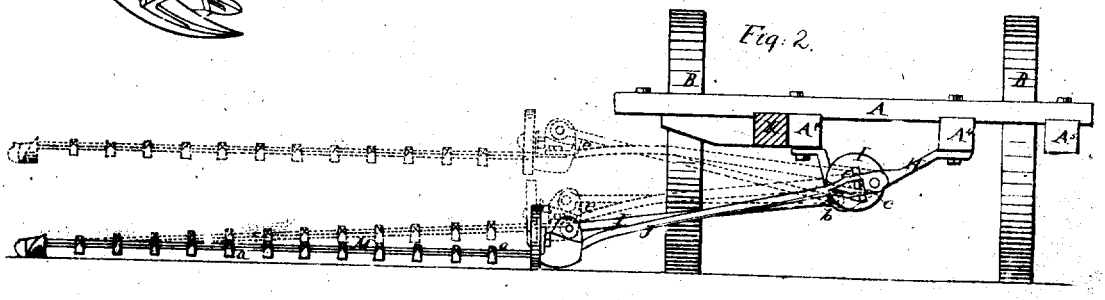

L. Miller.

Sheet 2. 2 Sheets

Mower.

№ 764

Reissued Jul. 19, 1859

UNITED STATES PATENT OFFICE.

LEWIS MILLER, OF CANTON, OHIO, ASSIGNOR TO C. AULTMAN & CO., OF SAME PLACE.

IMPROVEMENT IN HARVESTERS.

Specification forming part of Letters Patent No. 20,180, dated May 4, 1858; Reissue No. 764, dated July 19, 1859.

DIVISION A.

*To all whom it may concern:*

Be it known that I, LEWIS MILLER, of Canton, in the county of Stark and State of Ohio, have invented certain new and useful Improvements in Machines for Harvesting Grain and Grass, of which the following is a full, clear, and exact description, reference being had to the accompanying drawings, which make part of this specification, and in which—

Figure 3:
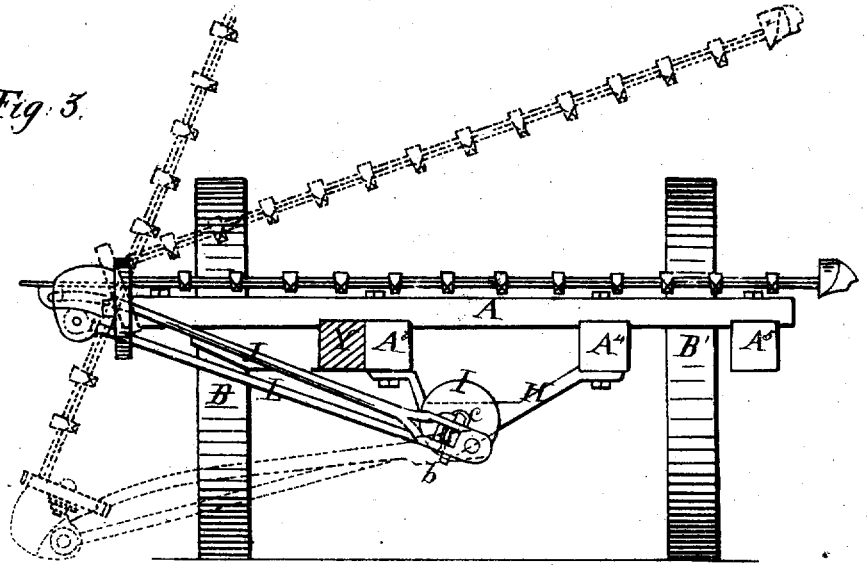
Figure 4:
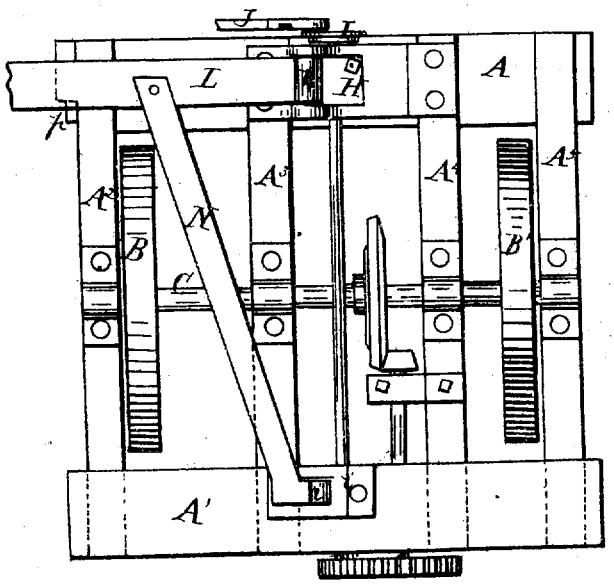
Figure 5:
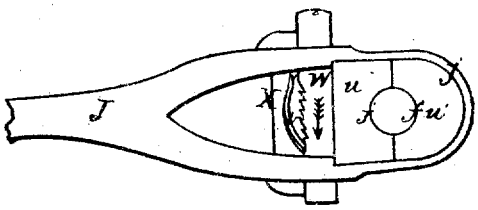
Figure 9:
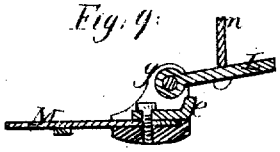

Figure 1 represents a view in perspective of the machine as arranged for mowing. Fig. 2 represents a front elevation of the machine, the black lines showing the finger-beam resting upon the ground in the position it will occupy when the machine is mowing on a level surface, the red lines showing the position of the finger-beam when mowing on an uneven surface, with its left end raised to conform thereto, and the blue lines showing the finger-beam raised off and held parallel to the ground by means of a hand-lever to pass over an obstacle. Fig. 3 represents by the black lines a front elevation of the machine, with the finger-beam folded over upon the frame in a compact manner. The red lines show the finger-beam raised on end preparatory to being lifted by the hand-lever and turned over upon the frame, and the blue lines show the finger-beam almost raised up and turned over upon the frame. Fig. 4 represents a view of the under side of the main frame and certain parts connected therewith, but showing more particularly the arrangement of the brace for supporting the coupling-arm. Fig. 5 represents on an enlarged scale a view of one side of a portion of the connecting-rod which transmits motion from the crank to the cutter. Fig. 6 represents a front view of the quadrant-lever for lifting, and the ratchet teeth and detent for holding up, the finger-beam when raised; also a fragment of the adjacent part of the frame detached from the machine. Fig. 7 represents a similar view of the same parts, the quadrant-lever and its ratchet-teeth being in the position they occupy when turned aside to disengage the teeth from the detent preparatory to raising or lowering the finger-beam, and Fig. 8 represents a view of the side of the quadrant having the ratchet-teeth thereon. Fig. 9 represents a vertical section at the line *x x* of Fig. 1, showing the knuckle of the joint connecting the finger-beam and coupling-arm.

That side of the machine on which the finger-beam projects when on the ground, in the position shown in Fig. 1, I call the "right" side; the other I call the "left" side.

Comparatively few farmers raise their crop of grass for hay on a single large meadow, as grass thrives best in moist ground not well adapted to raising grain, and such ground is usually in small patches in the low places scattered over the farm. Hence in mowing his crop the farmer usually finds it necessary to draw his machine through numerous narrow lanes and rough by-paths in taking it to the various grass-patches to be mowed. A machine of the ordinary construction with the finger-beam projecting at one side can scarcely be conveyed along such paths, except when placed upon a wagon or sled and carried with the finger-beam end foremost. This mode of transportation involves so much labor and inconvenience in loading and unloading that various contrivances have been made to avoid it, the most efficient of which contrivances, so far as my knowledge extends, is one heretofore patented by Aultman and Miller and which consists in turning the finger-beam into an upright position against the frame, which renders the machine quite as narrow as an ordinary wagon; but this leaves it top-heavy, and also with a great preponderance of weight on one side, so that when the machine is much lower on the side on which the finger-beam is hung than on the other side it is very liable to overturn.

To remedy these defects by rendering the machine more stable and more compact, and therefore more portable, is the object of the invention which is claimed under this patent, and which consists in so constructing and arranging the machine that the finger-beam, together with the cutting apparatus, can be lifted up and folded over upon the main frame, where it lies compactly and securely, thus rendering the machine capable of being moved about on rough and narrow roads as safely and conveniently as a common cart.

In the accompanying drawings, the main frame A $A'$ $A^2$ $A^3$ $A^4$ $A^5$ of the machine is supported by an axle, C, and a pair of wheels, B and B′. A tongue, Y, projects from the front of the frame for the horses to draw the machine by.

The finger-beam M, which supports the guard-fingers *a*, and the cutter K are connected by a coupling-arm, L, to the main frame, the arm being hinged at one end to the finger-beam and at the other to a bracket, H, on the under side of the main frame, which bracket projects downward about half-way from the under side of the frame to the ground.

The coupling-arm is connected by a cord, *n*, or the equivalent thereof, to a quadrant, Q, which is secured by a pivot, *q*, to the beam $A^2$ of the frame and turned by a lever, R, for the purpose of raising and lowering the coupling-arm and finger-beam suspended to the quadrant by the cord.

The finger-beam is folded over upon the frame by first raising its right end and turning it up against the frame into the position shown by the red lines in Fig. 3. Then the right end of the coupling-arm, with the finger-beam pressing upon it, is raised, the finger-beam turning by its own weight toward the left side of the frame, as shown by the blue lines in Fig. 3, and the raising of the coupling-arm and the turning downward of the finger-beam toward the left are continued until the finger-beam is laid bottom upward upon the frame, as shown by the black lines in Fig. 3, when the machine is reduced into such a compact and secure shape that it may be taken safely wherever an ordinary wheeled vehicle can safely be drawn by a team.

The other portions of the machine, which do not relate to the subject-matter of the claim under this patent, I do not deem it necessary to describe more particularly here.

What I claim under this patent as my invention is—

Hinging the finger-beam to the main frame, so that it can be folded up thereon, substantially as herein described.

In testimony whereof I have hereunto subscribed my name.

LEWIS MILLER.

Witnesses:
N. HAUKER,
JAS. S. TONNER.